Dec. 19, 1961 L. WEBERMAN 3,013,763
SEAT ADJUSTER
Original Filed July 5, 1957 4 Sheets-Sheet 1
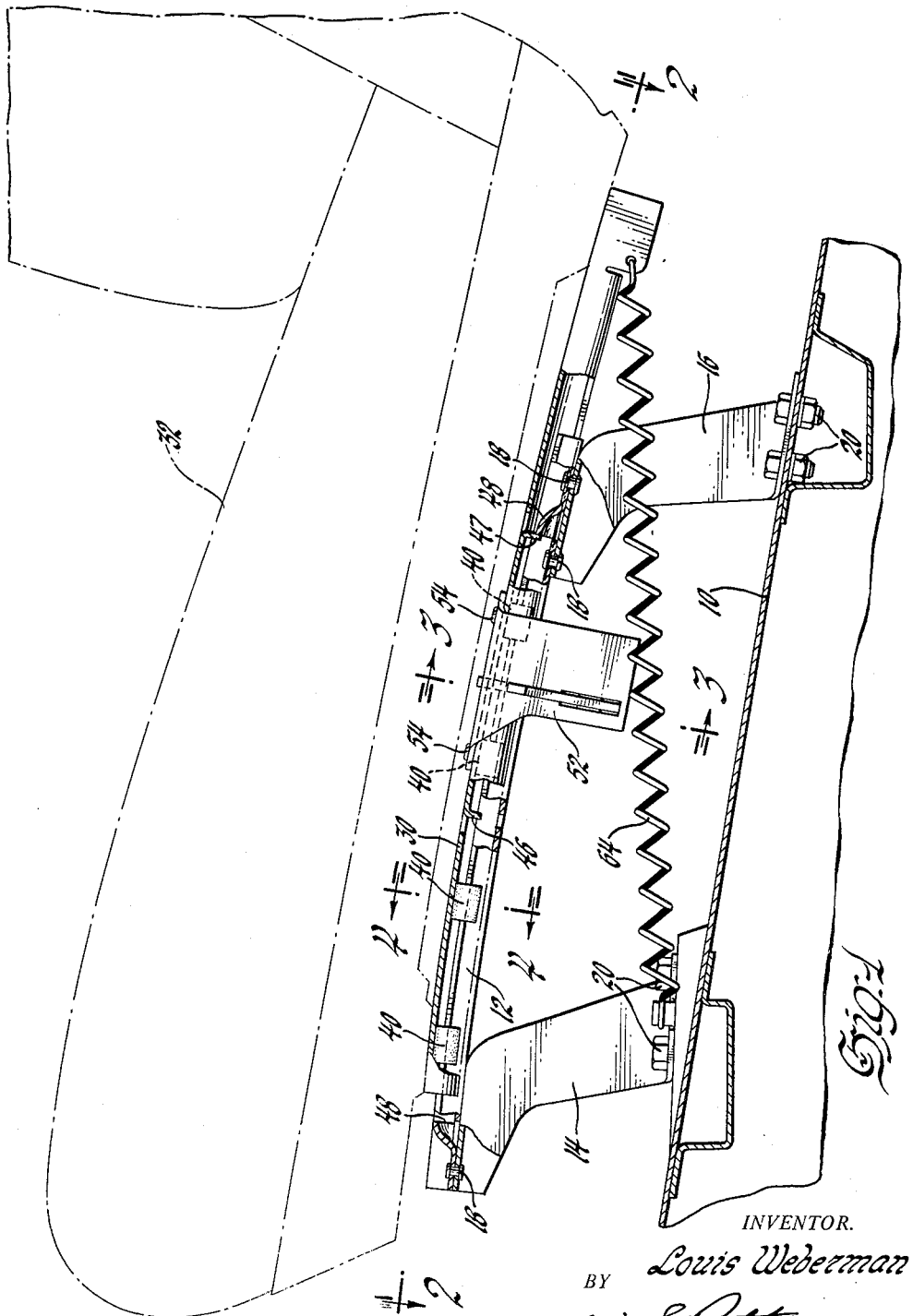
INVENTOR.
Louis Weberman
BY
W.S. Pettigrew
ATTORNEY Dec. 19, 1961    L. WEBERMAN    3,013,763
SEAT ADJUSTER
Original Filed July 5, 1957    4 Sheets-Sheet 2
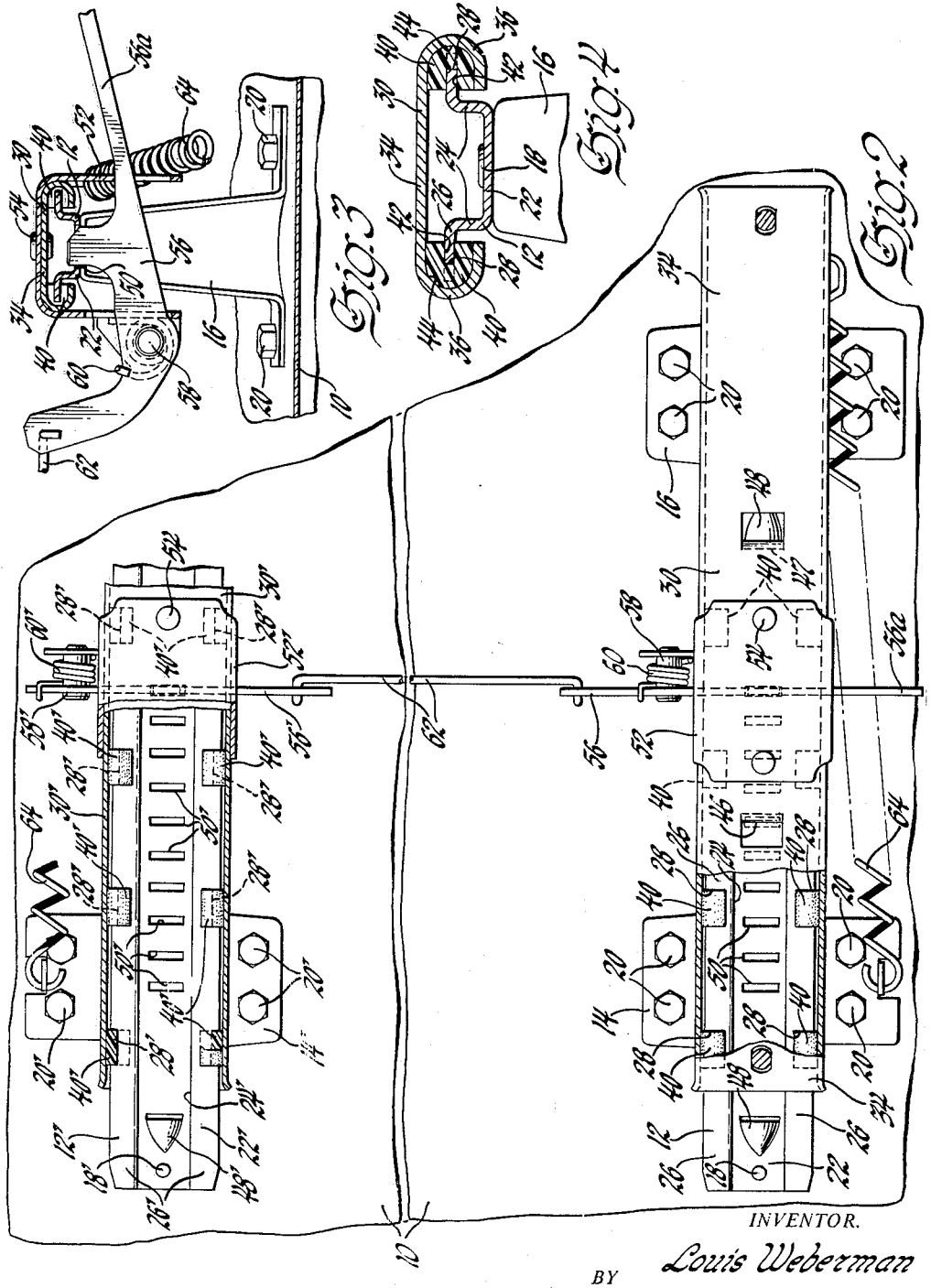
INVENTOR.
Louis Weberman
BY
W. S. Pettigrew
ATTORNEY Dec. 19, 1961
L. WEBERMAN
3,013,763
SEAT ADJUSTER
Original Filed July 5, 1957
4 Sheets-Sheet 3
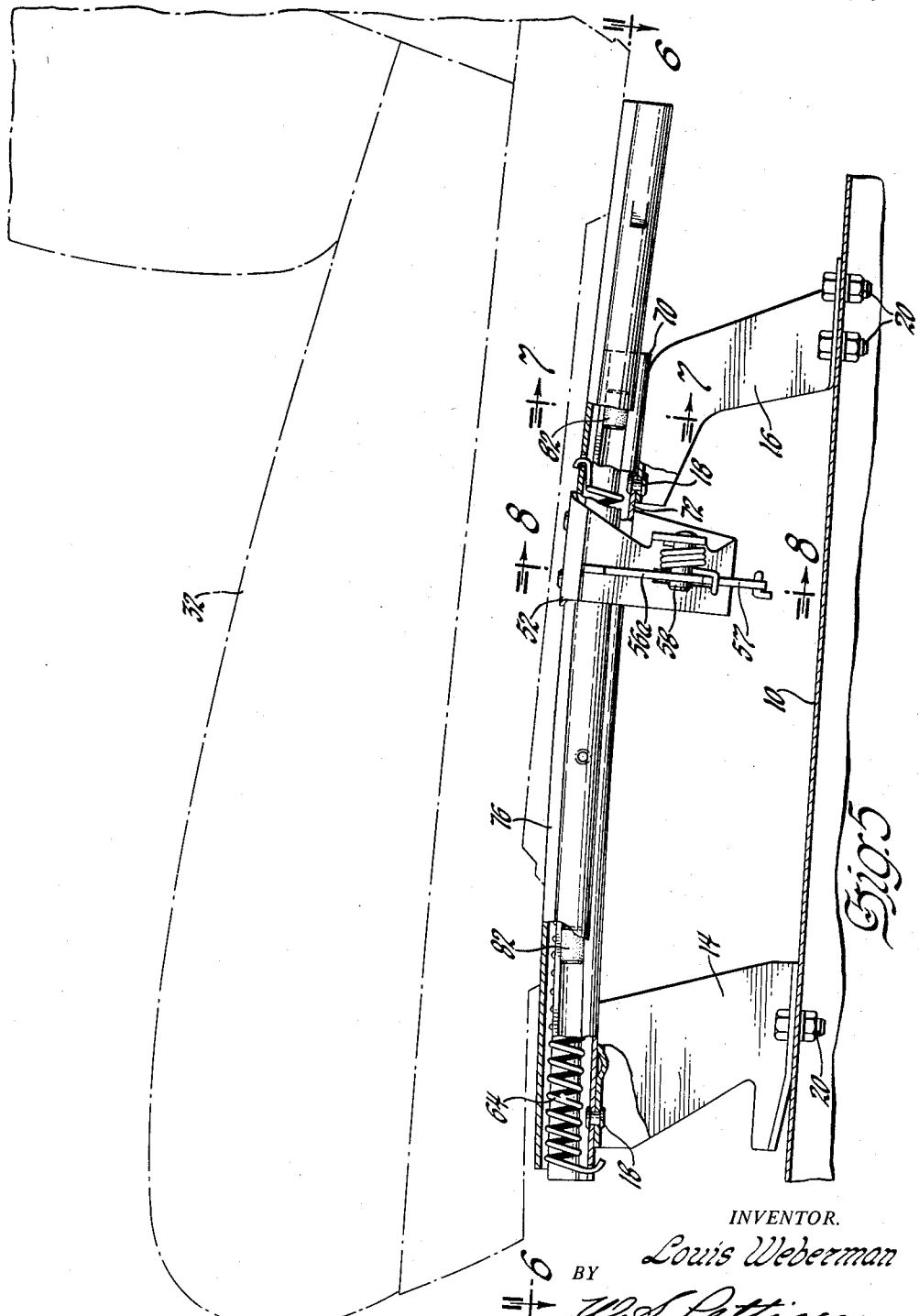
INVENTOR.
Louis Weberman
BY
W. S. Pettigrew
ATTORNEY Dec. 19, 1961
L. WEBERMAN
3,013,763
SEAT ADJUSTER
Original Filed July 5, 1957
4 Sheets-Sheet 4
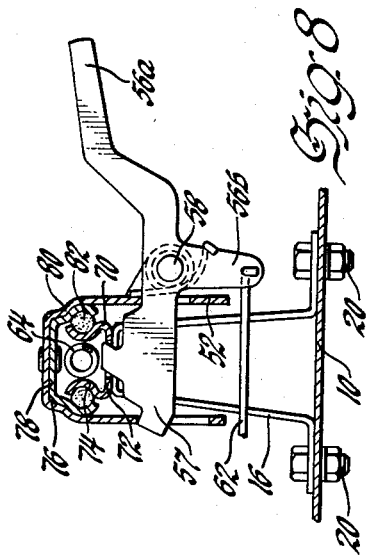
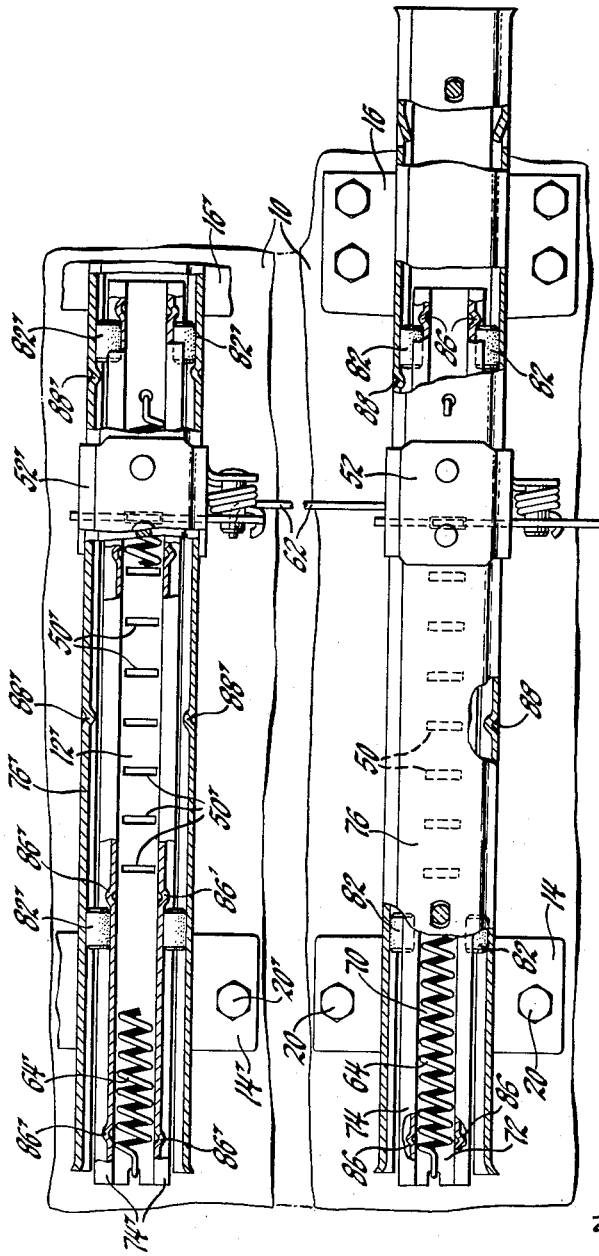
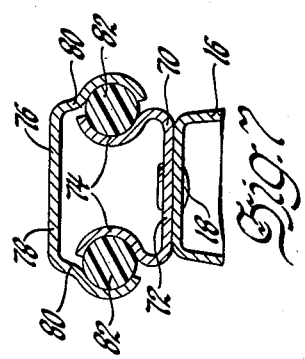
INVENTOR.
Louis Weberman
BY
W. S. Pettigrew
ATTORNEY

United States Patent Office 3,013,763
Patented Dec. 19, 1961

3,013,763
SEAT ADJUSTER
Louis Weberman, Detroit, Mich., assignor to General Motors Corporation, Detroit, Mich., a corporation of Delaware
Original application July 5, 1957, Ser. No. 670,345. Divided and this application Mar. 4, 1960, Ser. No. 12,723
2 Claims. (Cl. 248—429)

This invention relates to a seat adjuster, and more particularly to an automobile seat adjuster having improved slidable bearing means. This is a division of my copending application entitled "Seat Adjuster," filed July 5, 1957, as Serial No. 670,345, now Patent No. 2,971,009, issued January 4, 1961.

One feature of the invention is that it provides an improved seat adjuster; another feature of the invention is that it provides a seat adjuster having novel bearing means for facilitating horizontal adjustment; another feature of the invention is that the improved construction permits a lower overall channel height in a seat adjuster; still a further feature of the invention is that it provides a stationary lower channel member having a plurality of elongated bearing surface portions formed in opposite walls thereof, an elongated upper movable channel member having complementary elongated bearing surface portions in opposite walls and a plurality of elongated bearing slugs of anti-friction material, as nylon, between said channels and in slidable engagement with at least one of the channels; and a further feature of the invention is that the bearing surface portions of both channels are arcuate about a given radius when viewed in transverse section and the bearing slug is formed as a cylinder having the same radius and the bearing stud is slidable relative to both channels.

Other features and advantages of the invention will be apparent from the following description and drawings, in which:

FIG. 1 is a vertical longitudinal section through a portion of a vehicle showing one side of the seat adjuster and showing a portion of the seat mounted thereon;

FIG. 2 is a longitudinal horizontal section taken along the line 2—2 of FIG. 1, the center portion of the structure between the seat adjusters being broken away to simplify the drawing;

FIG. 3 is a retail section through the channel members and the latch taken along the line 3—3 of FIG. 1;

FIG. 4 is a detail section through the channel members and two of the bearing slugs, taken along the line 4—4 of FIG. 1;

FIG. 5 is a view similar to FIG. 1 but showing a modified form of the invention;

FIG. 6 is a longitudinal horizontal section taken along the line 6—6 of FIG. 5, the center portion of the structure between the seat adjusters being broken away to simplify the drawing;

FIG. 7 is a detail section through the channels and two of the bearing slugs, taken along the line 7—7 of FIG. 5; and FIG. 8 is a detail section taken along the line 8—8 of FIG. 5.

Referring now more particularly to FIGS. 1 through 4 of the drawings, 10 is the floor of an automobile upon which the seat adjuster is mounted in the front passenger compartment. As shown in FIG. 2, there is a separate channel assembly at each opposite side of the automobile. Except for details of the latch which have no bearing on this invention, the right and left hand channel assemblies are similar and parts in the right hand assembly which are similar to parts in the left hand assembly are designated by the same reference character with the addition of a prime ('). The opposite channel assemblies may be interconnected by one or more stabilizer bars (not shown) to prevent the seat from becoming cocked. An elongated stationary lower channel 12 is fixedly mounted on the floor 10 by means of a mounting bracket 14 at the front end and a mounting bracket 16 adjacent the rear end. The channel 12 is secured to the mounting brackets by rivets 18 and the respective brackets are fixedly secured to the floor by bolts 20. As shown in FIGS. 3 and 4, the lower channel is generally of U-shape in transverse section, having a base 22 and opposite upstanding side walls 24, each terminating in an outwardly turned horizontal flange 26. Each of these flanges has four longitudinally spaced notches 28 as shown best in FIGS. 2 and 4 to provide bearing surface portions or bearing seats.

An elongated upper movable inverted channel 30 is mounted atop the lower channel 12 for slidable movement therealong and a seat 32 is mounted on the upper channel member. As shown in FIGS. 3 and 4, the upper channel has a base 34 merging at each opposite side in a downwardly extending curved wall 36, each wall 36 being curved in a predetermined manner, preferably being curved to provide a bearing surface portion. The upper channel is astride the lower channel with each curved wall extending around and below the horizontal flange portions 26 of the lower channel.

In order to mount the upper channel on the lower channel for slidable movement therealong, there are a plurality of bearing slugs 40 of anti-friction material, preferably nylon, fixedly mounted at spaced intervals on the lower channel. As shown in FIGS. 2 and 4, there are four of these bearing slugs along each side of each of the lower channels, one being fixedly mounted in each of the notched bearing seats. Each of the slugs is formed with a longitudinal slot 42 along its inner face for snug reception of the horizontal flange 26 of the lower channel and each slug fits into one of the notches cut into these flanges and is held by the end walls of the notch against longitudinal movement relative to the stationary channel. The outer surface of each slug is curved as shown at 44 in FIG. 4 on the same curvature as the inner surface of the wall 36 of the upper channel so that the slug engages both channel members throughout substantially its entire length and has sliding engagement with the upper channel member. This construction provides lateral stability combined with substantially frictionless sliding movement between the channels, and at the same time permits a channel construction of lower overall height than is found in other seat adjusters which utilize steel balls, rollers and the like. In order to limit the range of sliding movement of the bearing slugs and the channels relative to each other, there are two stop shoulders 46 and 47 bent from the base 34 of the upper channel. The front stop shoulder 46 may cooperate with a forward stop 48 on the lower channel to limit sliding movement in one direction and the rear stop 47 may cooperate with a similar rear stop (not shown) on the lower channel to limit rearward movement.

Latch means are provided to hold the upper channel in a selected position on the lower channel. As shown in FIG. 2, the lower channel is formed with a plurality of keeper notches 50. A movable latch element for cooperation with these notches is carried on the upper channel. As shown in FIGS. 1, 2 and 3, there is a U-shaped bracket 52 mounted on the upper channel by rivets 54 and a latch 56 is pivotally mounted at 58 on this bracket, a torsion spring 60 being employed to bias the latch toward latching engagement with a selected keeper notch 50. The latch on the left hand seat adjuster has an integral handle 56a projecting outwardly therefrom for manual manipulation to release the latch. No manual operator is needed for the latch on the right hand seat adjuster because there is a connecting rod 62 connected between the two latches so that operation of the handle 56a releases both latches. At each side of the seat adjuster there is a spring 64 connected at the forward end to the floor support and at the rearward end to the upper channel to assist in forward sliding movement of the seat.

Since the anti-friction slugs 40 are of constant thickness throughout substantially their entire length, and since these slugs are in direct engagement with both channel members throughout substantially the entire length of the slugs, much more lateral stability is provided between the upper and lower channels of this seat adjuster than is the case where there is merely point contact from a series of balls or rollers. Furthermore, the long line of engagement reduces wear and, when combined with the inherent characteristics of material such as nylon, reduces or entirely eliminates grooving or Brinnelling of the channel.

FIGS. 5, 6, 7 and 8 show a modified form of the invention in which the transverse dimensional shape of the channels is different as is the shape of the bearing slugs and the means for mounting the bearing slugs. In other respects, the species of FIGS. 5–8 is generally similar to the species of FIGS. 1 through 4 (except for the location of the assist springs and details of the latch device) and the description of the basic well known seat adjuster elements will not be repeated. Reference characters similar to those used in FIGS. 1 through 4 are used in FIGS. 5 through 8 to identify the common parts.

Referring to FIGS. 7 and 8, there is an elongated stationary lower channel member 70 riveted to the front and rear floor supports 14 and 16, respectively. The channel 70 has a base 72 and opposite walls 74, a portion of each of which is curved inwardly in a predetermined manner, preferably about a given radius, to form bearing surface portions. The elongated upper movable inverted channel member 76 has a base 78 merging into downwardly depending walls 80, each of which has a portion curved outwardly about the same radius to form elongated bearing surface portions. A plurality of bearing slugs 82 of anti-friction material, preferably nylon, are mounted between the channels, each bearing slug being in slidable engagement with the bearing surface portion of both channel members. As shown best in FIGS. 6 and 7, the bearing slugs are cylindrical in form, having the same curvature as the complementary bearing surface portions of the channel members. The lower channel member is formed with detents 86 and the upper channel member is formed with complementary detents 88 for engagement with the slugs to limit the range of sliding movement.

The latch 57 shown in FIG. 8 is substantially identical with the latch shown in FIG. 3 except in the shape of the parts. In FIG. 8, the connecting rod 62 extends from an ear portion 56b of the latch member.

The seat adjuster of FIGS. 5 through 8 includes all the advantages of stability, easy sliding movement, low height and absence of grooving or Brinnelling effect that were described in connection with the latch of FIGS. 1 through 4. Since the cylindrical bearing slugs may slide with reference to both channel members, the sliding movement is subject to less friction and the wear of the parts is halved. As shown in FIGS. 5, 6 and 8, the assist spring 64 are carried in the channels, being connected at the front end to the lower channel and at the rear end to the upper channel.

While I have shown and described two embodiments of my invention, it is capable of many modifications. Changes, therefore, in the construction and arrangement may be made without departing from the spirit and scope of the invention as set forth in the appended claims.

I claim:

1. A seat adjuster comprising an elongated stationary lower channel member having opposite upstanding walls, each formed with a plurality of elongated bearing surface portions at least part of which are arcuate about a given radius when viewed in transverse section, means fixedly mounting said lower channel member on a floor support, and elongated upper movable inverted channel member atop said lower channel member and having opposite walls extending downwardly in spaced relation to said upstanding walls, each wall of the upper channel being formed with complementary elongated reversely facing bearing surface portions at least part of which are arcuate about said radius, means for mounting a seat on said upper channel member, and a plurality of cylindrical bearing slugs of anti-friction material mounted between said channels in slidable engagement with the bearing surface portions of both channel members, each of said bearing surface portions on the respective lower and upper channel members engaging an opposite side of the slug to provide lateral stability between the lower and upper channel members.

2. Apparatus of the character claimed in claim 1, wherein said bearing slugs have the same radius as said bearing surface portions, and wherein said channel members have detents located at opposite ends of each bearing slug and spaced apart a distance greater than the length of said bearing slug to limit the range of sliding movement of the bearing slug.

References Cited in the file of this patent

UNITED STATES PATENTS

| | | |
|---|---|---|
| 2,759,773 | Wilmer | Aug. 21, 1956 |
| 2,939,511 | Gilson | June 7, 1960 |